(No Model.)
J. B. CLOT.
CAN TESTING MACHINE.
No. 522,107. Patented June 26, 1894.
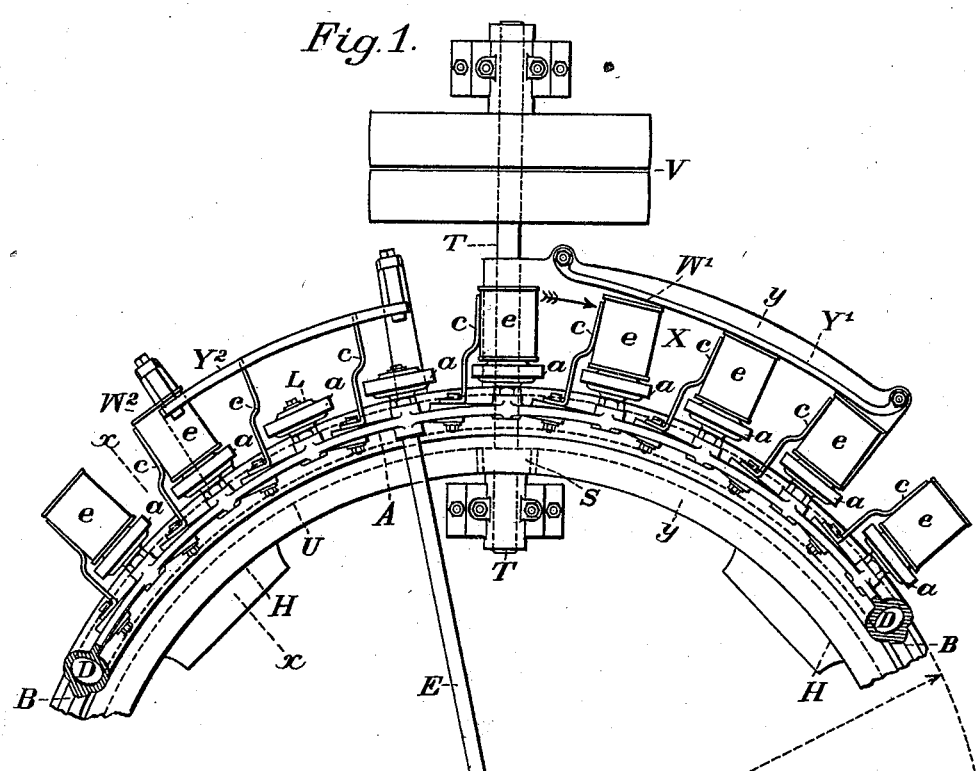
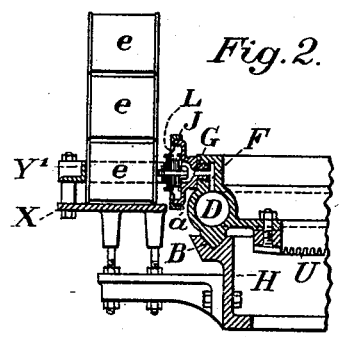
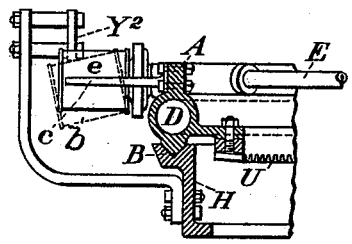
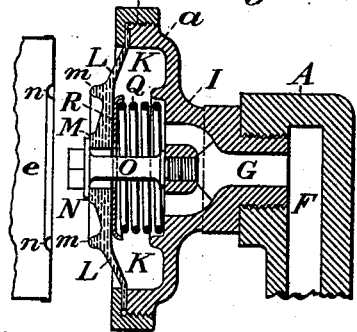
Witnesses:
E. A. Brandau
Wilson D. Bent, Jr.
Inventor:
John B. Clot
By John Richards
Atty

UNITED STATES PATENT OFFICE.

JOHN B. CLOT, OF SAN FRANCISCO, CALIFORNIA.

CAN-TESTING MACHINE.

SPECIFICATION forming part of Letters Patent No. 522,107, dated June 26, 1894.

Application filed December 27, 1893. Serial No. 494,831. (No model.)

*To all whom it may concern:*

Be it known that I, JOHN B. CLOT, a citizen of the United States, residing in the city and county of San Francisco, State of California, have invented certain new and useful Improvements in Machines for Pneumatically Testing Packing-Cans, of which the following is a specification.

My invention relates to a machine and apparatus for automatically testing packing cans and detecting any leaks therein, and consists of various elements and appliances, illustrated in the following drawings, in which—

Figure 1 is a partial plan view of one of my improved can-testing machines. Fig. 2 is a transverse section on line $y$—$y$ of Fig. 1. Fig. 3 is a transverse section on the line $x$—$x$ of Fig. 1. Fig. 4 is an enlarged longitudinal section through one of the nozzles or nipples and its connected parts, by which the cans are tested.

In pneumatic can-testing machines operating by means of a partial vacuum, it is desirable to avoid valves and all apparatus to control intermittent action of the air for the release of the cans or otherwise; also packed or moving joints, and the object of my invention is to reduce the number and simplify the nature of the various parts and elements involved in such machinery or apparatus, and to secure more accurate results.

In the drawings, now to be referred to, and representing my improvements, the same letters of reference are applied to corresponding parts in the different figures.

A is a continuous annular hollow carriage, made in circular form, and mounted in angular ways B on a main frame H that supplies the place of axial support. This construction of the main table is not essential, but is preferable to avoid weight and for simplicity. This table A, or wheel, it may be called, has its axis of revolution at C, as indicated by dotted lines in Fig. 1, and is driven by a bevel pinion S, on the shaft T, meshing into a segmental gear rack U, on the bottom of the main table or wheel A, power being applied by fast and loose pulleys V in the usual manner.

Communicating with the annular chamber D is a pipe E leading to an air pump or other exhaust apparatus through the center of rotation at C, where a packed joint is provided; or such connection can be made by flexible hose, or otherwise, so long as a constant partial vacuum is maintained in the chamber D. From this annular chamber D are vertical passages or ports F, and horizontal passages G, communicating with the chamber K in the nozzles $a$, shown in the enlarged view Fig. 4, and of which there are a series inserted around the wheel or carriage A, as shown in Fig. 1. These nozzles $a$ consist of a hollow main member I, screwed into the wheel or carriage A, and provided with an external screw collar J, as seen in Fig. 4, under which is fastened at the sides a flexible diaphragm L, covering the main chamber K in the member or nozzle $a$. This flexible diaphragm L is pressed outward at its center by a coil spring Q pressing on a plate R, that forces the diaphragm L against the collar N on the stud or stem O, making an air-tight joint at M, as seen in Fig. 4.

Referring now to the operation of the machine, the table A being set in motion the cans $e$ are fed in at W', Fig. 1, being set in a pile vertically, as shown in Fig. 2, guided by a suitable frame, and descending by gravity to the platform X. The lower can is swept out from beneath the tier by the brackets $c$, one of which is fixed immediately behind each of the nozzles $a$. The can $e$ is in this manner carried forward until its outer end comes in contact with a tangential guide bar Y', which forces the can inward against the flexible diaphragm L, forming an air-tight joint between the mouth of the can and the soft material, and forcing back this diaphragm L so as to open the valve or joint at M, and thus expose the interior of the cans $e$ to the vacuum in the chambers K and D until the cans pass the guide bar Y', then the spring Q, having a force greater than the inward pressure of the air, forces out the diaphragm L, closing the joint at M, cutting off communication between the cans $e$ and the chambers K and D. By reason of the partial vacuum within, the cans are then held firmly against the flexible diaphragm L with a force equal to the area of the ring $m$ on the flexible diaphragm L. This ring or ledge fits into a corresponding groove $n$ $n$, around the mouth of the can e, as shown in Fig. 4, and if there is no leak of air the vacuum and pressure are maintained until the cans move around with the table A and come to the point W², where they pass under a diagonally set bar Y², and are deflected as shown by dotted lines at b, Fig. 3. This breaks connection between the can e and the flexible diaphragm L, permits the can to fill with air, and it rolls off in a suitable guide way. If, however, there are air leaks in the cans e after passing the guide bar Y' they fall off as soon as air therein is in equilibrium with the external atmosphere, and are collected for resoldering and testing. The diaphragm L is forced out by the spring Q against the collar or valve N, maintaining continually a partial vacuum in the chambers K and D at all points except W', where fresh cans are attached, thus dispensing with cocks, valves, or other devices to shut off or control the action of the atmosphere, greatly simplifying the machinery and insuring the certainty of its action, and rendering the operation rapid and continuous.

Having thus described the nature and objects of my invention, I claim—

1. In a can testing machine, an annular revolving table or wheel having a continuous air passage around and within the rim or periphery thereof, a radial air-exhausting pipe connecting with this air chamber or passage in the rim of the wheel and passing through its axis to an exhausting apparatus, a series of nozzles around the table or wheel communicating with the chamber or passage in its rim and provided with disk-valves closing outward by means of springs and opening inward by pressure of the mouths of the cans, in the manner substantially as and for the purposes specified.

2. In a can-testing machine, a table or wheel having a continuous chamber therein; an exhausting pipe connected thereto and extending to an air exhausting apparatus; a series of nozzles attached to the rim of the table or wheel and connecting with the chamber therein, these nozzles provided with flexible diaphragms closing automatically outward against a fixed collar or valve, in the manner substantially and for the purposes herein set forth and described.

3. In a can-testing machine, a rotary table or wheel; a vacuum chamber therein, and a series of hollow nozzles attached to the wheel and communicating with the vacuum chamber; a flexible diaphragm, forming a stop valve to close and seal the outer end of the nozzles by means of a spring, the force of which opposes and exceeds the inward air pressure on the diaphragm, in the manner substantially and for the purposes described.

4. In a can-testing machine, a series of nozzles in continuous communication with a chamber in which a partial vacuum is maintained, the outer ends of these nozzles covered by a flexible diaphragm forming a central valve or closing joint, as herein described, the latter adapted to being forced back and opened by pressure of the head of the can applied around a collar or valve; a spring to return the diaphragm, and automatically cutting off communication with the interior of the can when exhausted, in the manner substantially and for the purposes herein described.

5. In a can-testing machine, a chambered rotating table, and a series of nozzles attached thereto, in connection with pneumatic apparatus to create a partial vacuum in a chamber of the table and in the nozzles thereto attached; in combination with a guide bar that by pressure on the outer ends of the cans opens communication between their interior and the vacuum chamber in the revolving table, so arranged as to release the can and permit the nozzle to close when the air in the can is exhausted, in the manner substantially and for the purposes described.

6. In a can-testing machine, a rotating table or wheel provided with a series of hollow can-receiving nozzles; devices to apply the cans and devices to automatically exhaust the air from their interior, and retain them by suction on a flexible seat, until their tightness is determined, in combination with a guide or other like mechanism, to deflect the cans, and independent of the pneumatic apparatus, break their contact with the flexible diaphragm to which they are held by suction, in the manner substantially and for the purposes herein described.

7. In a can-testing machine, a series of moving suction nozzles, in communication with a chamber from which the air is partially exhausted; guide bars to automatically apply the cans by pressure on their ends, and open communication between their interior and the vacuum chamber, by means of a flexible diaphragm and a closing valve or collar as herein described; deflecting guides to mechanically separate the cans from the flexible diaphragm after they are tested, in the manner substantially and for the purposes specified.

In testimony whereof I have hereunto affixed my signature in the presence of two witnesses.

JOHN B. CLOT.

Witnesses:
ALFRED A. ENQUIST,
WILSON D. BENT, Jr.